(12) United States Patent
Beloussov et al.

(10) Patent No.: US 7,246,211 B1
(45) Date of Patent: Jul. 17, 2007

(54) SYSTEM AND METHOD FOR USING FILE SYSTEM SNAPSHOTS FOR ONLINE DATA BACKUP

(75) Inventors: Serguei Beloussov, South San Francisco, CA (US); Stanislav Protassov, Singapore (SG); Alexander Tormasov, Moscow (RU)

(73) Assignee: Swsoft Holdings, Ltd. (BM)

( * ) Notice: Subject to any disclaimer, the term of this patent is extended or adjusted under 35 U.S.C. 154(b) by 364 days.

(21) Appl. No.: 10/624,858

(22) Filed: Jul. 22, 2003

(51) Int. Cl.
G06F 12/00 (2006.01)
G06F 12/16 (2006.01)
G06F 12/06 (2006.01)

(52) U.S. Cl. .................. 711/162; 711/133; 707/200
(58) Field of Classification Search ............ None
See application file for complete search history.

(56) References Cited

U.S. PATENT DOCUMENTS

| | | | |
|---|---|---|---|
| 5,410,667 A | 4/1995 | Belsan et al. | |
| 5,720,026 A * | 2/1998 | Uemura et al. ............ | 714/6 |
| 5,819,292 A | 10/1998 | Hitz et al. | |
| 5,832,515 A | 11/1998 | Ledain et al. | |
| 5,905,990 A | 5/1999 | Inglet | |
| 5,996,054 A | 11/1999 | Ledain et al. | |
| 6,021,408 A | 2/2000 | Ledain et al. | |
| 6,038,639 A | 3/2000 | O'Brien et al. | |
| 6,061,770 A | 5/2000 | Franklin | |
| 6,101,585 A | 8/2000 | Brown et al. | |
| 6,173,377 B1 | 1/2001 | Yanai et al. | |
| 6,205,450 B1 | 3/2001 | Kanome | |
| 6,289,356 B1 | 9/2001 | Hitz et al. | |
| 6,341,341 B1 | 1/2002 | Grummon et al. | |
| 6,405,294 B1 * | 6/2002 | Hayter ...................... | 711/162 |
| 6,598,134 B2 * | 7/2003 | Ofek et al. ............... | 711/162 |
| 6,738,865 B1 * | 5/2004 | Burton et al. ............ | 711/133 |
| 6,799,258 B1 | 9/2004 | Linde | |
| 2002/0032691 A1 * | 3/2002 | Rabii et al. .............. | 707/200 |
| 2004/0010668 A1 * | 1/2004 | Inagaki et al. .......... | 711/162 |

* cited by examiner

*Primary Examiner*—Hyung Sough
*Assistant Examiner*—Duc T. Doan
(74) *Attorney, Agent, or Firm*—Bardmesser Law Group

(57) ABSTRACT

A system and method for providing online data backup for a computer system. In which the computer system includes an intermediate block data container. The computer system may utilize the intermediate block data container to manage data block release during the online data backup process. When the data storage driver receives a request to write a block into a data area that has already been copied by the backup procedure, then the required write is performed without limitations. If the incoming write request is directed to an area not yet backed-up, then the write process is suspended and the current state of the given data area is copied to the intermediate data storage container. When the copy procedure is completed, the system will allow the write procedure to be executed. Thus, the content of the data block at the moment the backup procedure commenced is stored in the intermediate block container. The content will be copied from the intermediate block data container by the backup procedure when required. The block will then be flagged and the backup process may continue.

46 Claims, 11 Drawing Sheets

INODE FILE
INDIRECT BLOCK

INODE FILE
BLOCK

REGULAR FILE
INDIRECT BLOCK

REGULAR FILE
DATA BLOCK

SYSTEM AND METHOD FOR USING FILE SYSTEM SNAPSHOTS FOR ONLINE DATA BACKUP

BACKGROUND OF THE INVENTION

1. Field of the Invention

The present invention relates to computer systems and, more specifically, to a system and method for providing online data backup.

2. Background and Description of Related Art

Typically, the operating system of a computer system includes a file system to provide users with an interface while working with data on the computer system's disk and to provide the shared use of files by several users and processes. Generally, the term "file system" encompasses the totality of all files on the disk and the sets of data structures used to manage files, such as, for example, file directories, file descriptors, free and used disk space allocation tables, and the like. Accordingly, end users generally regard the computer file system as being composed of files and a number of directories. Each file usually stores data and is associated with a symbolic name. Each directory may contain subdirectories, files or both. The files and directories are typically stored on a disk or similar storage device. File systems may provide several functions. As discussed above, the most basic task of a file system is provide access to files. File systems may also enhance system performance with additional functions such as, for example, caching, access markers and fault-tolerance.

Operating systems such as UNIX, Linux and Microsoft Windows manage computer file systems by defining a file object hierarchy. A file object hierarchy begins with a root directory and proceeds down the file tree. The file address is then described as an access path, e.g., a succession of directories and subdirectories leading to the file. This process of assigning a file address is called access path analysis or path traverse. For instance, the path "/r/a/b/file" contains the root directory (/), subdirectories "r", "a" and "b" and then the file. Typically, the processes within an operating system interact with the file system with a regular set of functions. For example, these functions usually include open, close, write and other system calls. For instance, a file may be opened by the open functions and this function acquires the file name as a target.

The file system may also include intermediate data structures containing data associated with the file system to facilitate file access. This data is called metadata and may include, for example, data corresponding to the memory location of the files, e.g., where the file is located in the hard drive or other storage medium. For example, in the context of a UNIX operating system, these intermediate data structures are called "inodes," i.e., index-node. An inode is a data structure that contains information about files in UNIX file systems. Each file has an inode and is identified by an inode number (e.g., i-number) in the file system where it resides. The inodes provide important information on files such as user and group ownership, access mode (read, write, execute permissions) and type. The inodes are created when a file system is created. There are a set number of inodes, which corresponds to the maximum number of files the system can hold.

Generally, a file system architecture that provides a recoverable file system is preferable to conventional file systems that lack this feature. In conventional systems, careful write and lazy write are the two main approaches to implementing input-output support and caching in file systems. Typically, careful write is implemented in file systems developed for VAX/VMS and other similar closed operating systems. Lazy write is generally implemented in the HPFS (High Performance File System) of the OS/2 operating system and in most UNIX file systems.

In the event of an operating system failure or power supply interruption, for example, input-output operations performed at that time are immediately interrupted. Depending on what operations were performed and how far the execution of these operations had advanced, such interruption may affect the integrity of the file system. Violation of file system integrity may adversely affect the system's ability to locate and access files. For instance, a given file name may be present in the directory list, but the file system may not be able to find this file and access its content. In the most serious case, damage to the file system may lead to the loss of an entire volume of data. A file system that implements careful write does not necessarily prevent violation of file system integrity. Instead, the system implementing careful write arranges records so that any system failure, in the worst case, may only cause unpredictable, non-critical mismatches that the file system can eliminate at any time.

When a file system of any type receives a request for renewal of disk content, the file system must perform several sub-operations before the renewal can be completed. In file systems using the strategy of careful write, these sub-operations always write their data onto the disk. When allocating disk space, e.g., for a file, the file system first sets the appropriate number of bits in its bit card, and then allocates space for the file. If a power supply interruption occurs immediately after those bits have been set, the file system with careful write loses access to that part of the disk, which was represented with the pre-set bits, but the existent data is not destroyed. Sorting write operations also means that input-output requests are performed in the order of arrival. If one process allocates disk space and soon afterwards the other process creates a file, the file system with careful write will complete allocation of the disk space before starting the creation of the file—otherwise the overlap of sub-operations from two input-output requests might lead to the violation of file system integrity.

The FAT (file allocation table) file system in MS-DOS uses the through-write algorithm, in which renewals are performed immediately, e.g., the cache memory is written to at the same time as main memory. Unlike careful write, this method does not demand input operations sorting from the file system to prevent a violation of integrity. The main advantage of file systems with careful write is that, in case of a failure, the disk volume remains intact and can still be used—an intermediate launch of a volume recovery utility is not required. A volume recovery utility is needed for correction of predictable, non-destructive failures of the disk integrity that occur as a result of a failure. But this type of utility can generally be run at any time, usually when the system reboots. However, file systems with careful write have some disadvantages such as, for example, low performance, redundant non-optimized accesses to a disk, among other drawbacks.

A file system utilizing the careful write policy generally sacrifices its performance for reliability. On the other hand, a file system with lazy write typically increase performance due to the strategy of write-back caching. Write-back caching is a caching method in which modifications to data in the cache aren't copied to the cache source until absolutely necessary. This method of caching using the lazy write policy provides several advantages over the careful write policy which accordingly increases system performance.

First, the number of write operations to the disk may be reduced. Because write operations are immediately performed, input operations are not required and the buffer's content may change several times before being written onto the disk. Second, the speed of servicing application requests sharply increases because the file system may return control to the calling program without waiting for the write to the disk to be completed. Finally, the strategy of lazy write ignores intermediate inconsistent states of a volume that generally occur when several input-output requests overlap in time. This policy therefore simplifies the creation of a multi-threaded file system, which allows simultaneous execution of several input-output operations.

But one disadvantage of the lazy write method is that, in some instances, a volume may acquire such an inconsistent state that the file system is unable to correct the volume in the event of a failure. Therefore, file systems with lazy write must always track the volume state. In general, a lazy write provides greater performance in comparison to the careful write policy but at the price of greater risk and user discomfort in the event of a system failure.

Recoverable file systems, such as, for example, Microsoft NTFS (Windows NT File System), may provide greater reliability than file systems with careful write, but also provide the performance of file systems with lazy write. Recoverable file systems guarantee integrity of the volume by using a journal of changes to handle transactions. For example, a journaled file system (JFS) is a file system in which the hard disk maintains data integrity in the event of a system crash or if the system is otherwise halted abnormally. The journaled file system maintains a log, or journal, of what activity has taken place in the main data areas of the disk. If a crash occurs, any lost data can be recreated because updates to the metadata in directories and bit maps have been written to a serial log. The journaled file system not only returns the data to the pre-crash configuration but also recovers unsaved data and stores it in the location in which it would have been stored if the system had not been unexpectedly interrupted. Accordingly, because recoverable file systems register all disk write operations in the journal, recovery may take only several seconds regardless of the volume size. The recovery procedure is generally precise and guarantees the return of the volume to the consistent state, in contrast to the typically inadequate recovery results of file systems with the lazy write policy, for example.

But the high reliability of the recoverable file system has its disadvantages. For each transaction that modifies the volume structure, the file system must enter one record into the journal file for each transaction sub-operation. The integration of journal file records into packets may increase the efficiency of the file system: for each input-output operation, several records may be simultaneously added to the journal. Moreover, the recoverable file system may use optimization algorithms, such as those used by file systems utilizing lazy write. The file system may also increase the intervals between writing the cache contents to the disk, because the file system can be recovered if a failure occurs before the modifications are copied from cache to the disk. The utilization of these tactics to improve performance generally compensates for and may even exceed the performance losses incurred by protocolling the transactions.

But, neither careful write nor lazy write can guarantee protection of user data. If a system failure occurs at the moment an application writes to a file, then the file may be lost or destroyed. Moreover, in the case of a lazy write policy, the failure may damage the file system because the lazy write policy may have destroyed existing files or even made all information on the volume unavailable.

In contrast, recoverable file systems, such as, for example, Windows NTFS, possesses greater reliability in comparison with traditional file systems. First, recoverability of NTFS guarantees that the structure of the volume will not be destroyed because, in case of the system failure, all files will remain available. Second, although NTFS does not guarantee safety of user data in case of the system failure because some modifications in cache can be lost, applications can use the advantages of a write-through policy and NTFS cache reset to guarantee that the modifications of any files will be written to the disk at the required time. Both write-through (e.g., the policy requires an immediate write to the disk) and cache reset (e.g., a forced write of the cache content to the disk) are quite effective operations. NTFS does not require additional input-output to write modifications of several various data structures of the file system to the disk, because changes in these structures are registered in the journal file (e.g., during one write operation). If a failure occurs and the cache content is lost, modifications of the file system can be recovered using information from the file journal. Moreover, NTFS, unlike FAT, guarantees that, after the write-through or cache reset operation are completed, user data will stay safe and will be available even if a system failure occurs afterwards.

Generally, NTFS supports recovery of the file system using the concept of an atomic transaction. An atomic transaction is an operation in which either all steps in the operation succeed, or they all fail, e.g., either all actions of the transaction happen or none happen. Atomic transactions are commonly used to perform data modifications in a data store, where either all the data relating to the operation is successfully modified, or none of it is modified and the data remains as it was before the operation started. Accordingly, single changes on the disk composing a transaction may be performed atomically, e.g., during the transaction, all required changes are to be moved to disk. If the transaction is interrupted by a file system failure, modifications performed by the current moment are cancelled. After back-off, the database returns to the initial consistent state that it possessed before the transaction began.

Note that journaling is not a panacea for this type of system failure. For example, a user may open a file and place a large volume of data into the file. In the middle of a write operation, a failure occurs and the system reboots. And, after recovery, the file will typically be empty—all the information that the user wrote into the file since the file was open has disappeared. Thus, journaling file systems are not designed for recovery of data at any price, but are instead dedicated to provide non-contradiction of file system metadata at the moment of failure. In particular, this type of system typically operates as follows: a user opens a file and if it opens successfully, the file system notes opening in its journal by recording a transaction. Then the user may start writing. But the file system does not record copies of this data. Accordingly, after failure recovery is completed, the back-off procedure restores the last successful transaction that occurred, e.g., the opening of a new empty file.

Examples of journaled file systems include ReiserFS, JFS, XFS (Extended File System), ext3 and NTFS. A journaling file system may relocate the journal to another independent device to provide asynchronous access for the purposes of optimization. For instance, XFS and ReiserFS may use relocated journals.

XFS was created by Silicon Graphics (now SGI) for multimedia computers with the Irix OS. XFS is oriented to very large files and file systems. During journal construction, some metadata of the file system itself are written to the journal such that the entire recovery process is reduced to copying these data from the journal into the file system. Accordingly, the size of the journal is set when the system is created, and is generally large, e.g., cannot be less than 32 Mb.

JFS was created by IBM for the AIX OS. OS/2 and Linux versions of JFS also exist. The journal size is typically about 40% of the file system size, but not larger than 32 Mb. This file system may contain several segments including the journal and data, and each of such segments can be mounted separately, e.g., "aggregates."

ReiserFS is an experimental file system designed for speed and survivability. The first prototype was called TreeFS. Currently, this system exists only for the Linux OS. Ext3 is the journaled superstructure for ext2 (Second-Extended File System)—the main and the most reliable file system for OS Linux. At present, this system is mainly developed by RedHat. One advantage of ext3 is that it does not alter the internal structure of ext2. The ext3 file system can be created from ext2 by running a journal creation program. An ext2 driver and an ext3 driver may be subsequently used to mount the file system and create the journal.

The development of file systems demonstrates that fault-tolerance and recoverability of file systems after failures are very important design considerations. To provide the maximum reliability, it is necessary to periodically copy all files as a immediate copy or cast of the file system, e.g., a snapshot. By its functionality, a snapshot is very similar to the journal of a recoverable file system, as they can both restore the system to the integral state. A snapshot guarantees full data recovery, but incurs high expenses in creation and storage.

Snapshot creation generally involves sector by sector copying of the whole file system, i.e., service information and data. If the file system is currently active, then files may be modified during copying—some files can be open for writing or locked, for example. In the simplest case, the file system can be suspended for some time and during that time a snapshot is recorded. Of course, such an approach cannot be applied to servers where uninterruptible activity of the file system is necessary.

Conventional file systems provide mechanisms to create snapshots without interrupting the operation of the file system. The following example is based on the Episode file system. Episode is designed to utilize the disk bandwidth efficiently, and to scale well with improvements in disk capacity and speed. Episode utilizes the meta-data logging to obtain good performance, and to restart quickly after a crash. Episode uses a layered architecture and a generalization of files called containers to implement file-sets. A file-set is a logical file system representing a connected sub-tree, e.g., logical elements representing a linked tree. File-sets are the unit of administration, replication, and backup in Episode. The design of Episode allows disposal of several 'file-sets' on one partition. The process of file-set cloning is used to create snapshots. The file-set clone is a snapshot, as well as a file-set, that can share data with the original file-set due to the copy-on-write techniques. The cloned file-set is available for reading only and it is generally placed on the same partition as the original file-set (e.g., available for reading and writing). Clones may be created very quickly and, most importantly, without interrupting access to data being copied. Cloning is accomplished by cloning all 'anodes' to 'file-sets'. In this context, an anode is similar to a 'mode' in BSD (the Berkeley Software Design version of Unix) with some minor distinctions. After copying each anode, both file-sets (new and old) point to the same data block. But the reference to the disk in the original 'anode' acquires the COW (copy-on-write) flag, such that, during block modification, a new data block is created (at which point the COW flag is removed).

Generally, under a COW policy, when the system copies a string, the "real" string to be copied (e.g., its content or bytes) is not actually copied in memory with the copy operation. Instead, a new string is created and marked as COW, and it points to the original string. When the system reads this flagged string, it is redirected to the original string. In the event an application wishes to write to the string (e.g., modify it), then the system notes the COW flag and performs the actual copying of bytes. The COW approach saves memory, because the system may create as many copies of a string as desired without requiring multiple allocations (unless they are modified). COW also improves the speed of the system, because the system requires less resources to copy a string under the COW methodology.

As a result, this file system allows the user to sort in time the changes that occur in the file system. This can be achieved because all modifications performed in the file system (or in any part of it) during a given period of time are written to a separate tree. These separate trees may be sorted in time and represent a full version of the file system modifications. Thus, to find the file state at a given moment, a user may search sequentially through the required file in the tree closest in time, e.g., if the desired file state was not found there, the user may search in the previous tree, etc.

Snapshots are also implemented in the WAFL (Write Anywhere File Layout) file system. WAFL is designed for network file servers. The main purpose of WAFL algorithms and data structures is to support snapshots, which, in this case, may be "read-only" file system clones. To minimize the disk space required by the snapshot, WAFL uses the copy-on-write technology. Moreover, WAFL snapshots may obviate the necessity of checking the file system integrity after a failure, which allows the file server to quickly start.

Typically, WAFL automatically creates and deletes snapshots according to a defined schedule and keeps a selected number of snapshot copies to provide access to old files. The copy-on-write technology is used to prevent doubling of disk blocks (in the snapshot and active file system). Only when the block in the file system is modified, will the snapshot containing this block be committed to disk space. Users may access the snapshots via NFS (Network File System). An administrator can use snapshots to create backup copies independently of the file system operation.

FIG. 1 illustrates the file system structure of a conventional WAFL system. As illustrated in FIG. 1, WAFL stores metadata in files and uses three types of files: (1) an 'node' file, containing 'node' for the file system; (2) a block map file, which identifies spare blocks and (3) an inode file map, identifying a spare inode. In this context, the term "map," not "bitmap," is used as these files may use more than one bit for each record. By storing metadata in files, a WAFL system may write blocks of metadata to any place on the disk. This design allows the system to use copy-on-write technology during the creation of snapshots, e.g., the WAFL system writes all data, including metadata, to a new place on the disk, without re-writing old data. Note that if the WAFL system could store data to any fixed place on the disk, this process would not be possible.

As shown on FIG. 1, the structure of a WAFL system may be represented as a tree of blocks, shown generally at 10, with a root inode 15 pointing to the inode file 20, and with metadata and files placed below. The root inode 15 is in the root of the file tree 10. The root inode 15 is a specific inode describing the inode file 20. The inode file 20 contains inodes describing other files in the file system, including the block map and inode map files, 25 and 30, respectively. The data blocks of all files form the "leaves" of the tree. FIG. 2 is a more detailed version of FIG. 1. FIG. 2 illustrates that files are composed of separate blocks and large files have additional links between modes and real data blocks. Loading the WAFL system requires locating the root of the file system tree. Accordingly, the block containing the root inode 15 is an exception to the rule "write to any place." The block containing the root inode 15 should be located in a fixed place on the disk.

FIG. 3 illustrates the creation of a snapshot in WAFL. In order to create a virtual copy of a tree of blocks, WAFL simply copies the root inode 15. This process is depicted on FIG. 3. FIG. 3a is a simplified version of the original file system in which internal nodes of the tree, such as inodes and indirect blocks, are omitted for clarity. FIG. 3b shows the process in which WAFL creates a new snapshot 35 by copying the root inode 15. The copied inode 35 becomes the root in the tree of blocks and it represents a snapshot of the root inode 15 in the same way a root inode 15 represents the real file system. When the snapshot's inode 35 is created, it points to the same disk blocks, shown generally at 40, as the root inode 15. Therefore, WAFL does not change a snapshot's blocks because it copies new data to the new place on the disk. Accordingly, a new snapshot does not take additional disk space (excluding the space taken to create the snapshot's inode).

FIG. 3c depicts the situation when a user modifies a data block 40, e.g., data block D. WAFL writes new data to the block D' on the disk and modifies the pointer to point to the new block in the active file system. The snapshot 35 continues to point to the old block D, which remains unmodified on the disk. As files are modified or deleted in the active file system, the snapshot 35 refers to the growing amount of blocks, instead of being associated with the active file system. Moreover, the snapshot 35 will take more and more disk space.

Different file systems have different methods for creating snapshots. For example, the manner in which snapshots are created in WAFL provides advantages over the corresponding process of Episode. In Episode, instead of copying the root mode, a copy of the whole inode file is created. This significantly loads the disk subsystem and consumes a lot of disk space. For example, a 10 Gb file system with one inode per each 4 Kb of disk space will allocate 320 Mb for an inode. Accordingly, in this type of file system, creation of a snapshot through inode file copying will generate 320 Mb of disk traffic and take 320 Mb of disk space. Creation of ten such snapshots will take nearly one third of the free disk space, after taking the modification of blocks into account. In contrast, by copying the root inode, WAFL quickly creates a snapshot without overloading the disk subsystem. This advantage is important, because WAFL creates snapshots every several seconds to implement a mechanism of recovery after failures.

FIG. 4 shows transition from FIGS. 3b to 3c in more detail. When a disk block is modified, all of its content is relocated to a new location. Accordingly, the block's parent must also be updated or modified to point to a new location. In addition, the parent's parent must also be re-written to a new location and so on.

If the file system performed a write for several blocks at each modification, the system would incur substantial performance penalties. Instead, WAFL caches several hundreds of modifications before writing. During the write, WAFL allocates disk space for all data in cache and performs a disk operation. As a result, blocks that are often modified, such as indirect blocks or inode file blocks, are written once during cache reset instead of each time the data is modified.

Accordingly, due to the disadvantages associated with conventional data backup systems, there is a need for a data backup process that is both reliable and efficient. Moreover, there is a need for an online data backup process that allows a computer system to remain online while data is being backed-up and also addresses the disadvantages associated with conventional back-up systems.

SUMMARY OF THE INVENTION

The present invention relates to a system and method for providing online data backup for a computer system. In an exemplary embodiment of the present invention, the computer system includes an intermediate block data container. The computer system may utilize the intermediate block data container to manage data block release during the online data backup process. When the data storage driver receives a request to write a block into a data area that has already been copied by the backup procedure, then the required write is performed without limitations. But if the incoming write request is directed to an area not yet backed-up, then the write process is suspended and the current state of the given data area is copied to the intermediate data storage container. When the copy procedure is completed, the system will allow the write procedure to be executed. Thus, the content of the data block at the moment the backup procedure commenced is stored in the intermediate block container. The content will be copied from the intermediate block data container by the backup procedure when required. The block will then be flagged and the backup process may continue. Thus, the delays that result from writing to the main storage are reduced to a minimum and the programs running on the computers connected to the data storage can continue working substantially without pause.

A more complete understanding of the system and method of the present invention will be afforded to those skilled in the art, as well as a realization of additional advantages and objects thereof, by a consideration of the following detailed description of the preferred embodiment. Reference will be made to the appended sheets of drawings which will first be described briefly.

BRIEF DESCRIPTION OF THE DRAWINGS

FIGS. 9-1 and 9-2 are a flow chart illustrating the method of online data backup of the present invention;

DETAILED DESCRIPTION OF THE PREFERRED EMBODIMENT

The present invention provides a system and method for file system backup without suspending online application programs using a file system snapshot. Accordingly, the present system and method significantly increase computer system availability and allows backing up without interrupting computer services.

The computer file system is usually located on the block data storage and typically interacts with storage at the level of blocks. For example, read and write operations are performed in connection with data areas that have sizes that are divisible by the size of one block. The sequence of the blocks in the storage is ordered and each block has its own number. The computer system may include several such storages and the file system may take only a portion of one such storage, the whole storage, or several such storages or their parts. On the disk or storage device, these type of storages are usually located in partitions, taking the entire partition.

Figure 1:
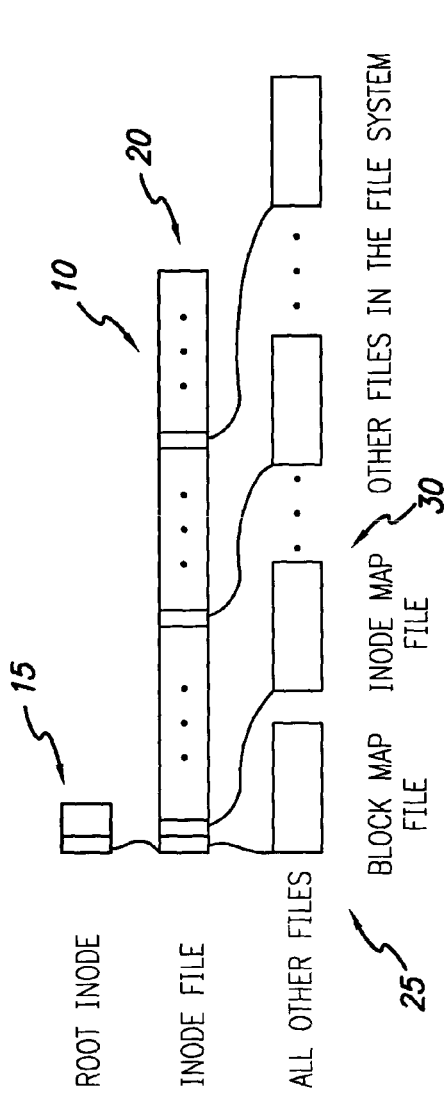
FIG. 1 is a prior art WAFL file system.
Figure 2:
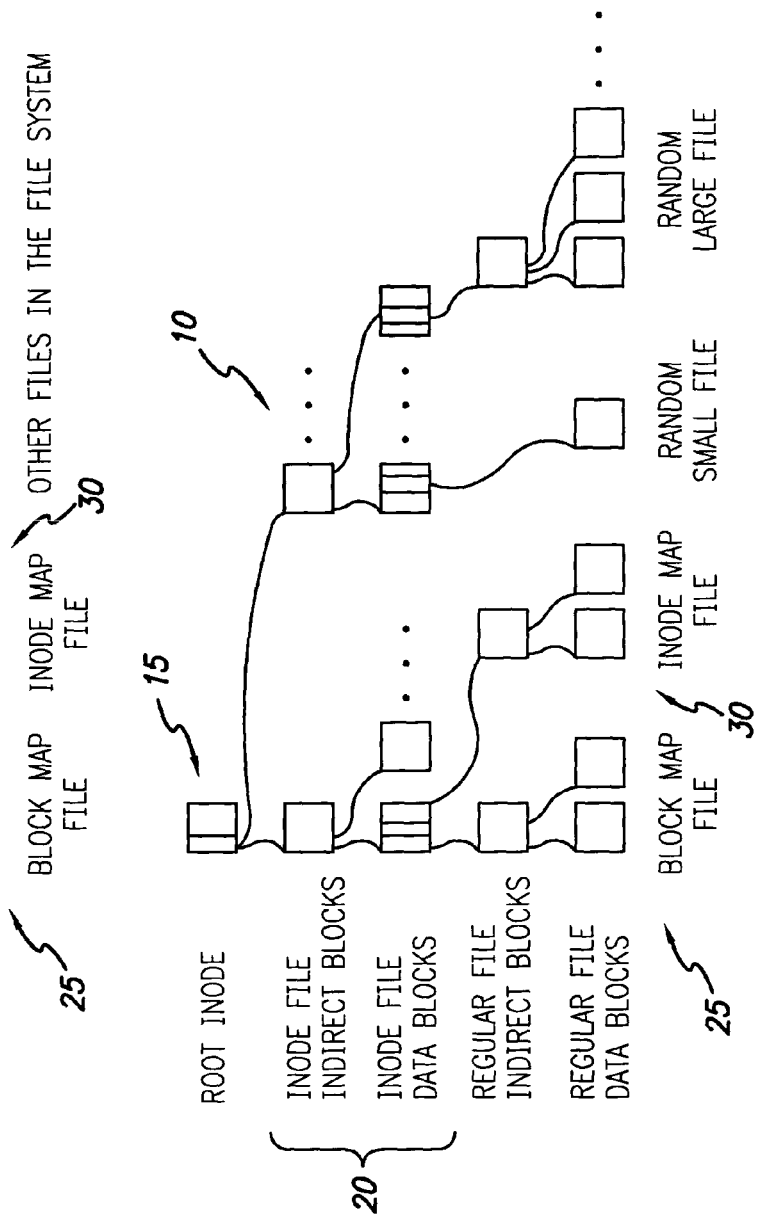
FIG. 2 is another illustration of a prior art WAFL file system.
Figure 3:
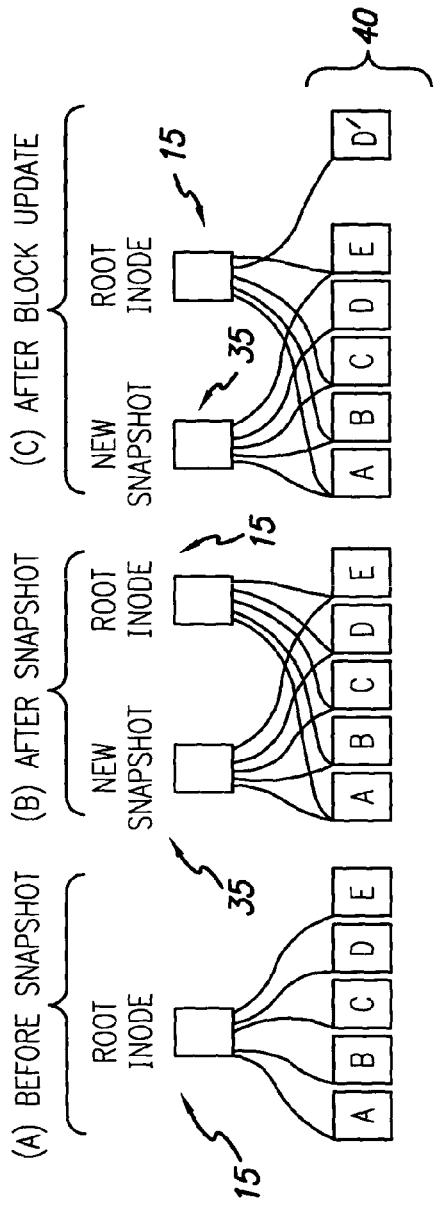
FIG. 3 shows the process of creating a snapshot of a prior art WAFL file system.
Figure 4:
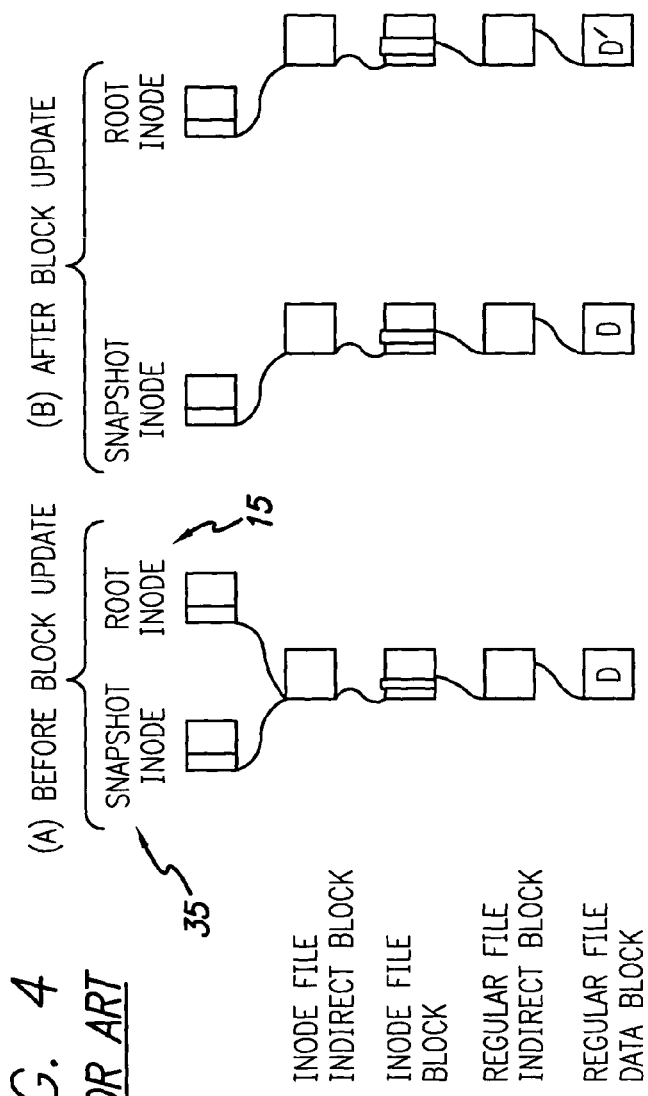
FIG. 4 is another illustration of the process of creating a snapshot of a prior art WAFL file system.
Figure 5:
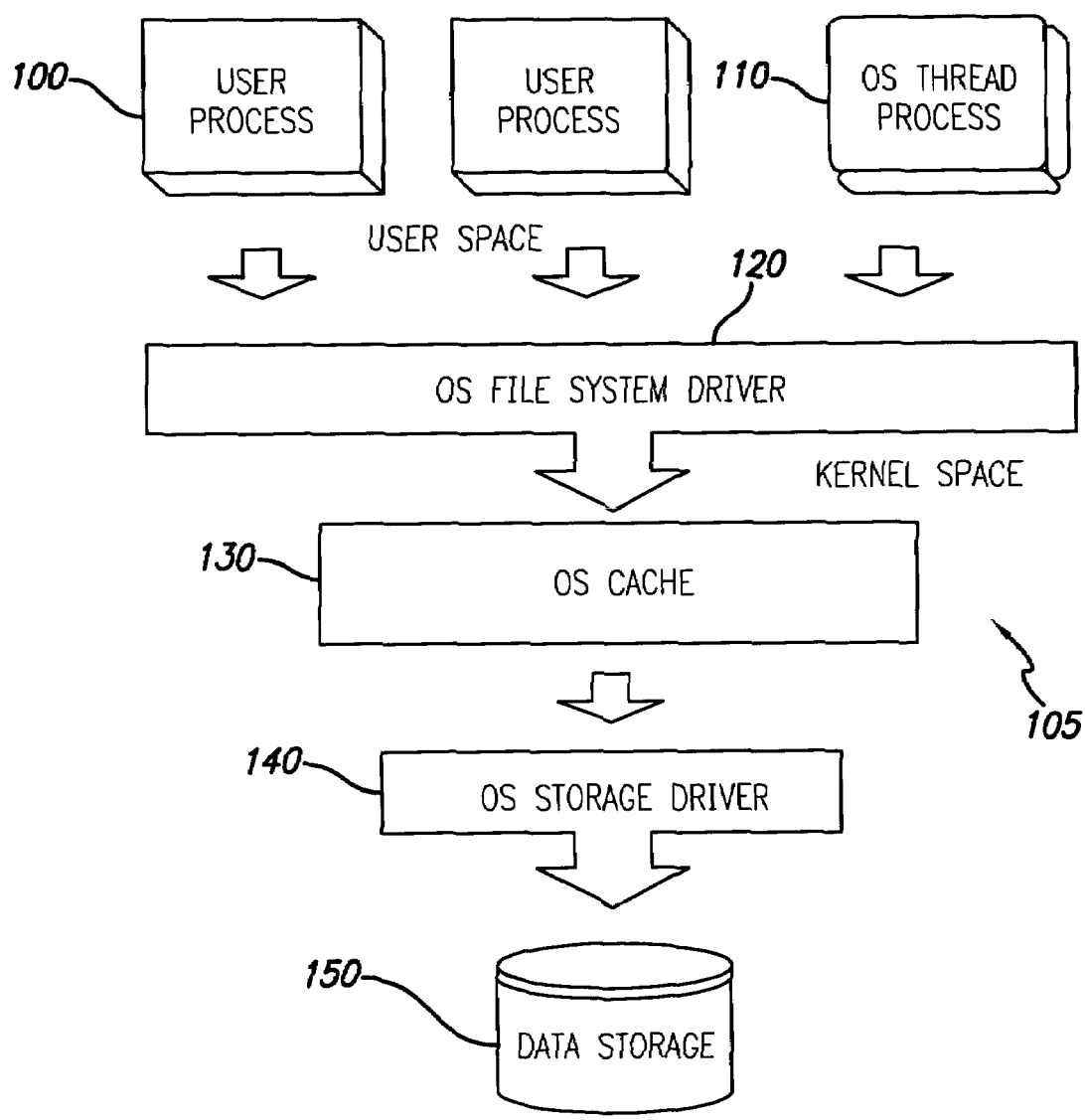
FIG. 5 shows an exemplary embodiment of the computer system of the present invention.

The file systems may be subdivided into several categories, including the housekeeping data of the file system volume, file metadata, file data, and free space not occupied by the other data. A file system driver embedded into the operating system may provide the servicing for the file system. FIG. 5 shows an exemplary embodiment of the computer system of the present invention, shown generally at 105. The computer system 105 includes a data storage device 150 that may be accessed by one or more user processes 100 or OS thread processes 110. OS user processes 100 or OS thread processes 110 may request to read or write data to the data storage 150 via a file system request.

This request may be directed to the file system driver 120, which defines where in the data storage the relevant data blocks are located. The request is then directed to the OS cache 130 where the requested data may be currently cached. If the requested data is located in the OS cache 130, the system may complete the requested operation by allowing the user process 100 or OS thread process 110 to read and write of the cached data. If the requested data is not located in the OS cache 130 or is otherwise unavailable (e.g., the space in cache must be freed pursuant to an OS algorithm), the request is transmitted for execution to the driver OS storage driver 140. The OS storage driver subsequently performs the requested operation on the selected data located in the data storage 150.

The data storage driver 140 may interact with the storage device 150 in block mode. As discussed above, in the context of data management, a block is a group of records on a storage device. Blocks are typically manipulated as units. For example, a disk drive may read and write data in 512-byte blocks. Accordingly, the data storage driver 140 may receive requests for data read and write using blocks of the selected block size. Typically, each data block is associated with a number or label corresponding to the type of operation to be performed. Thus, the driver associated with the data write operation acquires a set of numerical pairs (e.g., the data block and number) in order to process the data write command.

Figure 6:
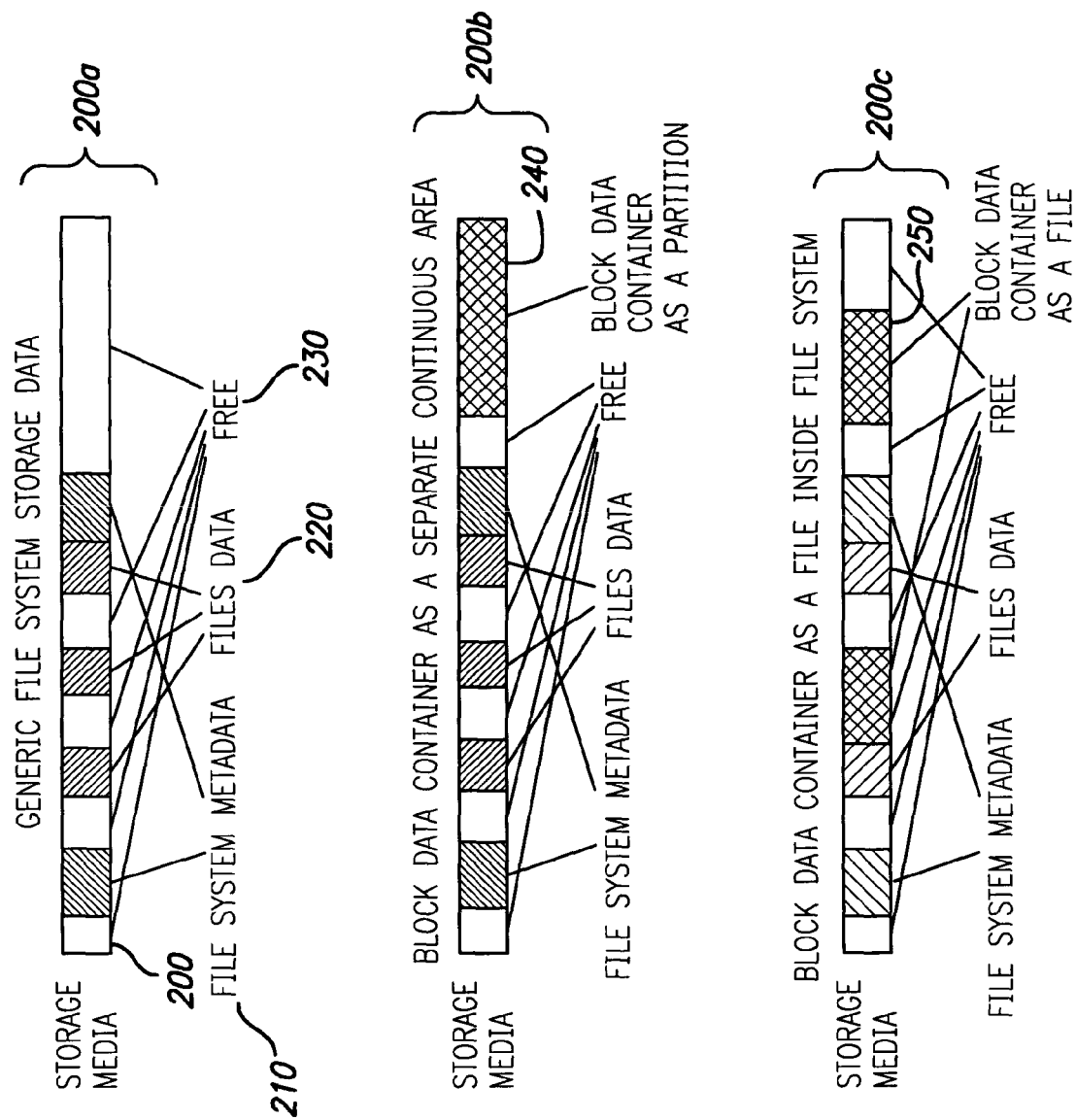
FIGS. 6a, 6b and 6c show exemplary embodiments of the system storage, including exemplary embodiments of the intermediate block data container of the present invention.

FIG. 6 illustrates an exemplary embodiment of the system storage device. Storage medium 200 is a file system storage data device or location. From the point of view of the file system, the blocks of data stored in the block data storage medium 200 can be characterized into several different classes. Depending on the file system type, the storage medium 200 can store data specific for the volume, metadata of the file system 210, file data 220, or free space 230 not currently taken by other data. Generally, a specific data type may be allocated to an entire data block and different data types cannot be combined in one block. But under specific circumstances, a file system may combine different data into one block (e.g., ReiserFS or Microsoft Windows NTFS).

Thus, by copying all data blocks that are not free (e.g., all blocks except entirely free blocks 230), the system may obtain a file system snapshot that serves as a copy of its state at a current moment of time. Although listing the file system blocks is not a requirement, listing may be used to optimize the space used by the backup procedure. In the event this information cannot be acquired by the system, the block fetching procedure may select all of the blocks associated with storing any file system data, including free blocks.

As discussed above, a data backup operation is time consuming. Thus, in order to conform backed up data with any specific state at a given moment, the data being copied must not change before the backup operation is completed.

Figure 7:
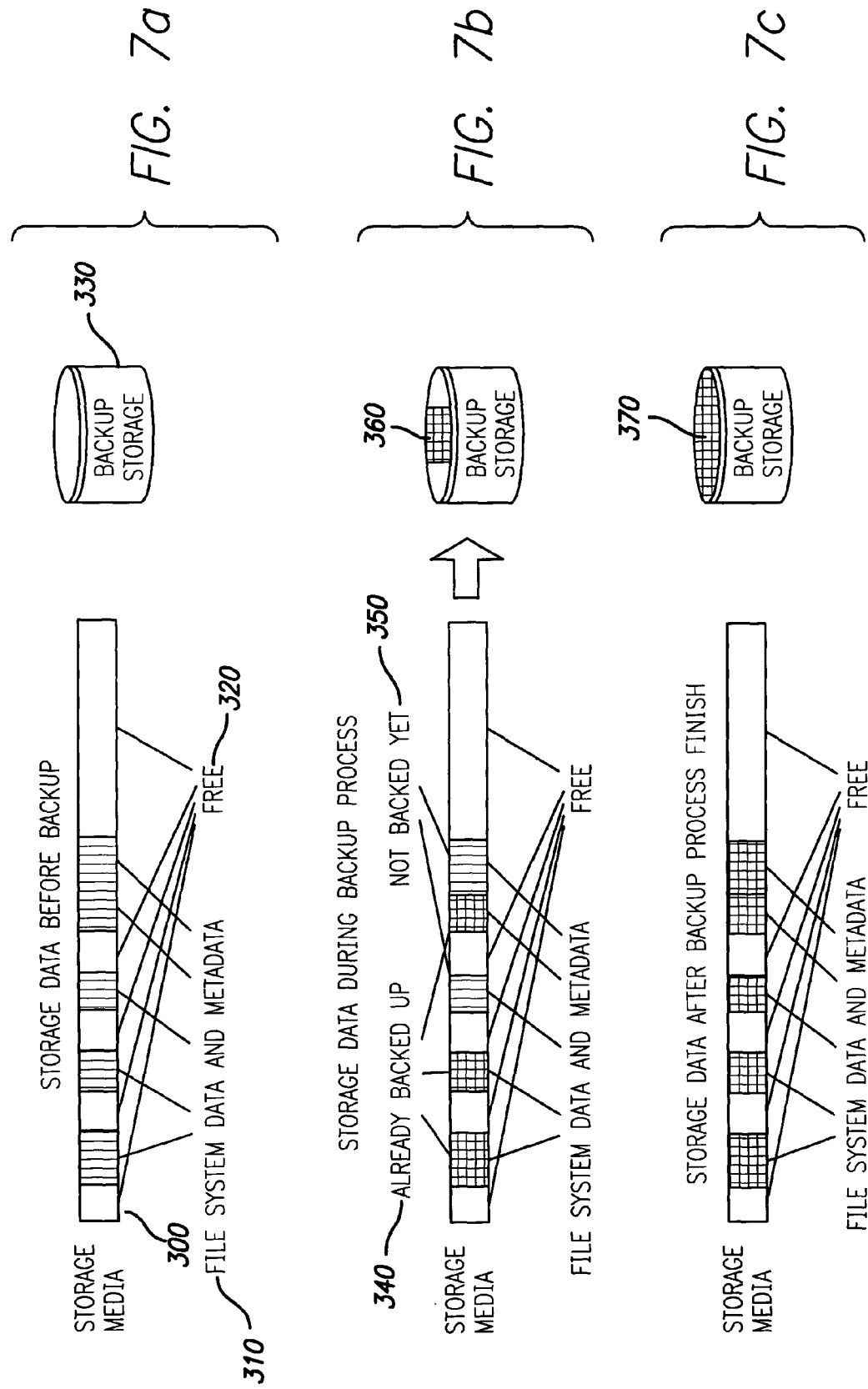
FIGS. 7a, 7b and 7c show the process of data backup.

Typically, this task is not difficult if the data storage and the file system associated with the storage are not connected to any active computer or is otherwise blocked from data modification. Basically, the risk of nonconforming data is reduced if there are no processes able to modify data. FIG. 7 illustrates a conventional consecutive write process of the file system data during a typical (e.g., not online) data backup procedure. In order to carry out the data backup, the data storage medium 300 must be re-written to the backup storage 330. FIG. 7a shows the status of the storage data before the backup process has been initiated. In order to optimize the backup process by increasing performance and reducing space requirements, the system will only copy the occupied areas 310 and not the free blocks 320. During the this process, as shown in FIG. 7b, the file system data subject to backup may be in the two different states: (1) data that is already backed up 340 to the storage 360; and (2) data that is not yet backed up, but only scheduled for backup 350. When backup is completed, as shown in FIG. 7c, all of the data is now located in the backup storage 370, and the file system and main data storage are subsequently ready for user operations and access.

If the file system is connected to an active computer and there are file system processes and user applications working with data during the backup process (e.g., on-line backup), then the task becomes more complicated. On-line backup is typical for servers with a high level of accessibility and therefore cannot be stopped to allow backup to be completed.

Figure 8:
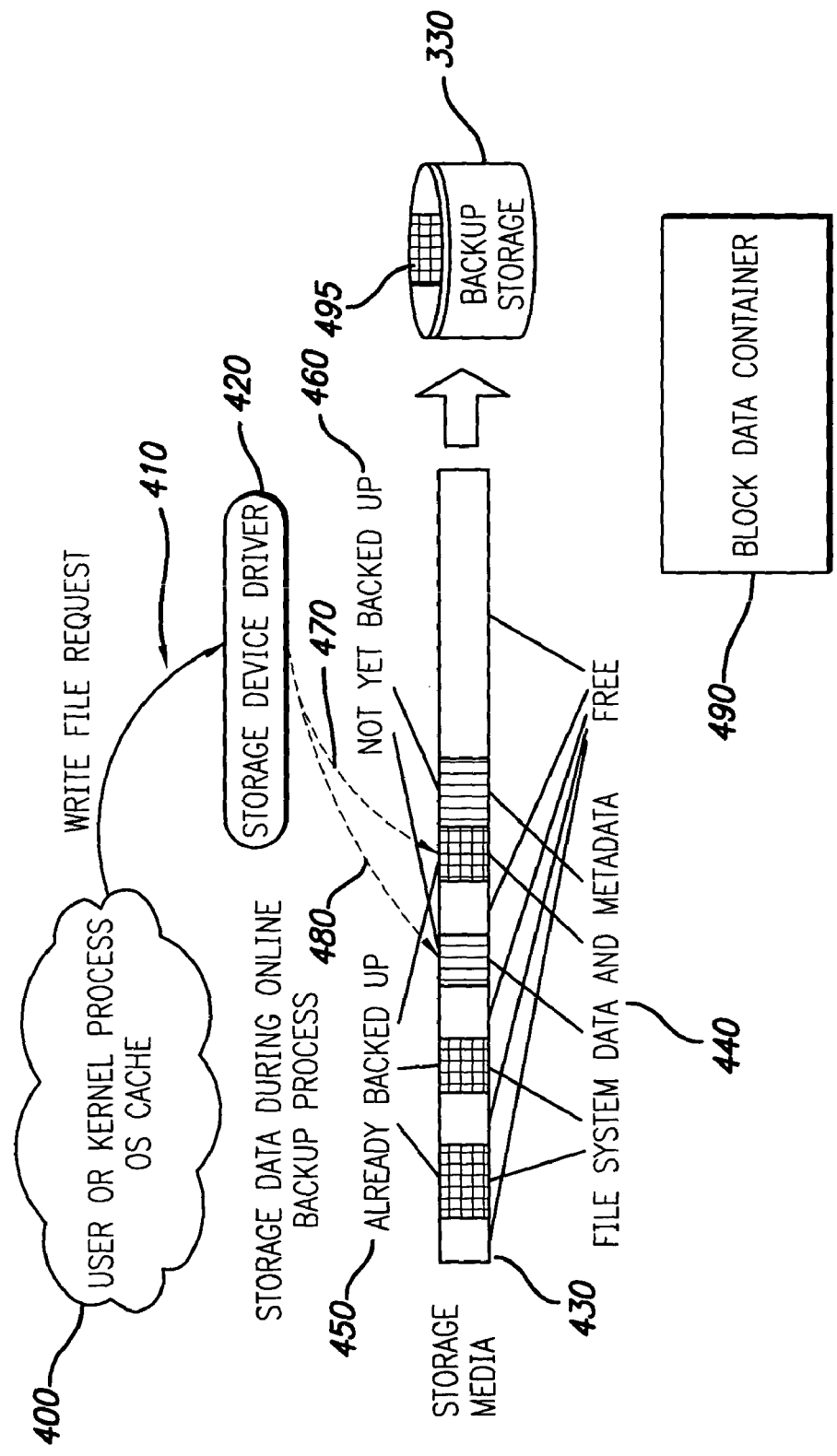
FIG. 8 shows an exemplary embodiment of the data backup process of the present invention.

FIG. 8 illustrates an exemplary embodiment of the online backup process that addresses the shortcomings of offline data backup. For the purposes of illustration, the following example assumes that the backup process for the data of block data storage 430 is launched such that the backup process may be performed within the off-line backup procedure. Initially, a user process or file system process 400, such as, for example, a disk cache, issues a write request 410 to the data storage that is received by the storage device driver 420. In response to write request 410, the storage device driver 420 transmits modification requests, shown as 470 and 480, to the appropriate stored data. In this example, the modification requests 470 and 480 are directed to data that is subject to the backup process 440. Accordingly, the modification process may request the data area 450 that has already been copied to the backup storage 495 (i.e., request 470) or data 460 that has not yet been copied or backed-up (i.e., request 480). Request 470 can be performed without damaging the backed up data, because backup is a one-pass process that does not require a return to data areas that have already been processed. But, in conventional systems, request 480 cannot be performed because the integrity of the backed-up data can be adversely affected. For example, a modified block that does not belong to the given copy can penetrate into the backup copy. This can make the correct recovery of the file system state impossible because data may refer to different points in time. As a result, the integrity of the data would be compromised.

To solve this problem, one exemplary embodiment of the present invention includes a temporary data storage container 490 designed to address the situations discussed above and utilizes a method of data backing up into a backup storage, described below.

The backup procedure of the present invention operates at the level of the underlying file system and may be implemented with a file system based on a block storage principle. The method of the present invention includes a procedure to define the data and metadata of the file system by the number of the block to which the subject data belongs. For internal purposes, the backup procedure efficiently defines which blocks have been copied or are subject to being copied.

As discussed above, the intermediate data storage container 490 may be any storage device suitable for storing data. For example, intermediate data storage 490 may be a temporary buffer based on the block design of the data storage 330. Intermediate data storage container 490 may be a memory located that is external to the backed up data storage space 330. Alternatively, or in addition, intermediate data storage container 490 may be placed in a dedicated part of the data storage space 330, which can represent a separate partition of the storage (shown as block data container 240 in FIG. 6b) or as a file within the file system (shown as block data container 250 in FIG. 6c) that has been reserved for the purpose of providing a temporary data storage container.

Figures 1, 9:
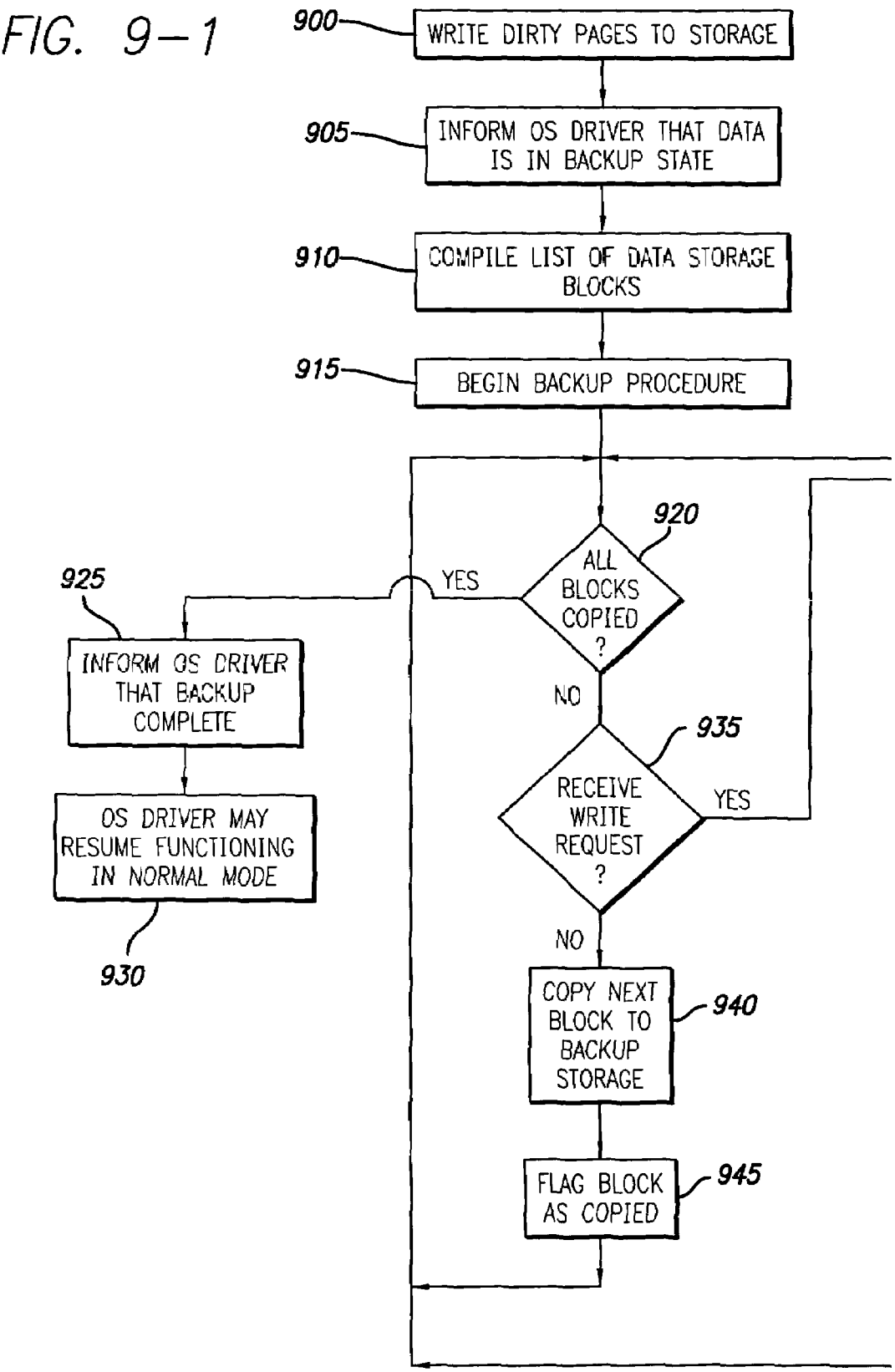
Figures 2, 9:
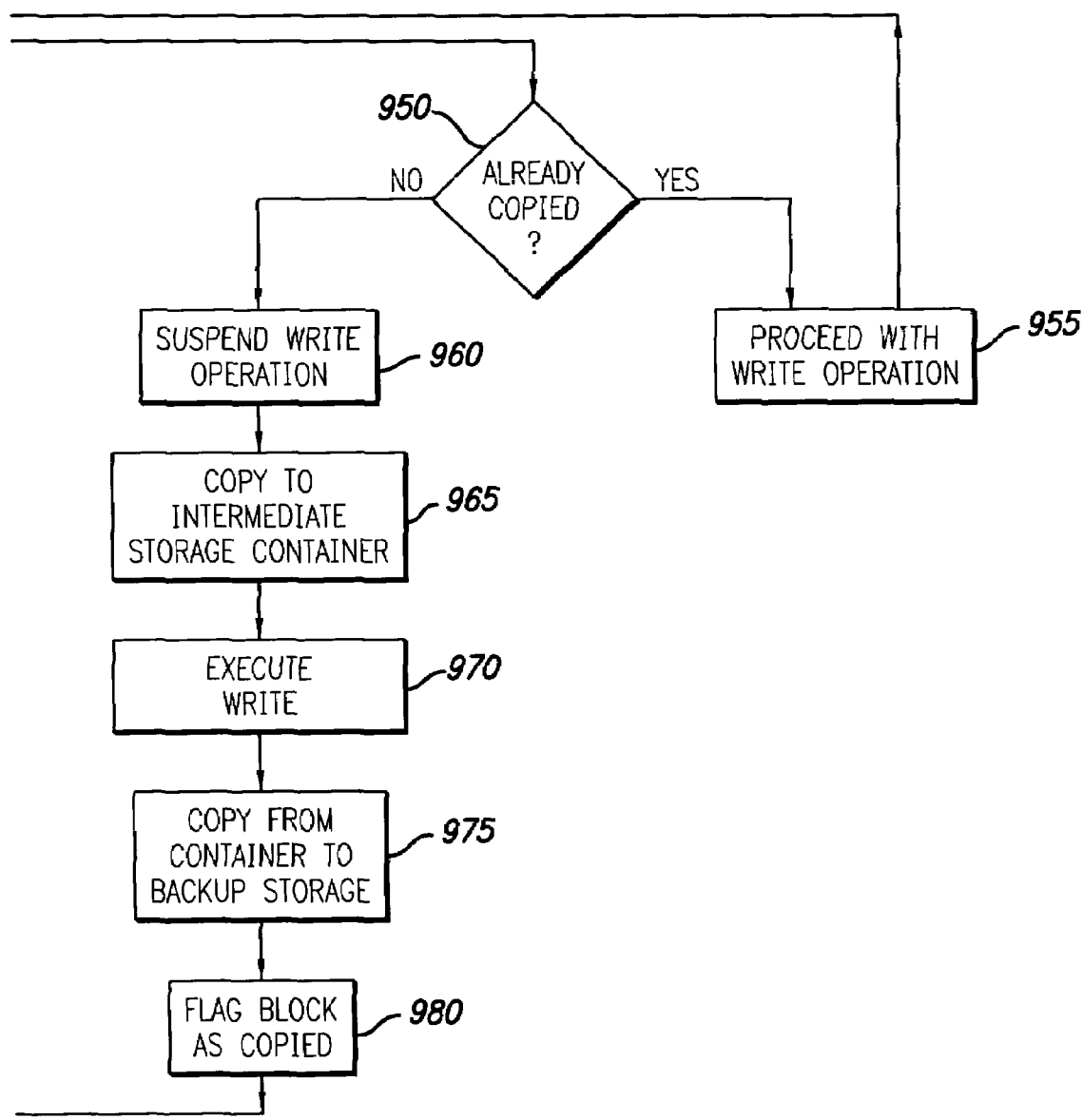

FIG. 9 shows an exemplary embodiment of the online backup procedure of the present invention. The on-line backup procedure of the present invention may begin with the step of informing the operating system driver responsible for servicing the data storage that the data is in the backup state, shown at step 905. In an alternative embodiment, the system may call an operating system cache reset procedure to write "dirty" pages into the data storage before informing the operating system driver about the initiation of the backup process, as shown at step 900. This procedure increases the actuality of the data stored in the snapshot. After the system has informed the operating system driver, the system then compiles the list of data storage blocks at step 910. This list contains the file system data of different types that should be backed-up during the backup process. Once the list has been generated, the backup procedure may begin at step 915. Until the system reaches the end of the list (see step 920) or receives a write request (see step 935), the system goes down the list and copies the blocks into the backup storage at step 940. On completion of each block backup the block is flagged or marked as backed-up, as shown at step 945. During the backup process, blocks preferably remain invariable. When the last block is backed-up or the backup procedure is canceled, then at step 925, the OS driver servicing the data storage is informed that the backup procedure is completed and the driver may continue functioning in the customary mode at step 930. Note that cancellation may be induced by the appearance of fatal errors, by the user's decision or by the processes of the operating system.

The OS driver servicing the data storage is preferably able to communicate with system agents running the backup procedure. Once the backup procedure is initiated, this driver provides the backup procedure with the data block numbers that have been requested for write into the data storage by the operating system or a user process.

The backup procedure, depending on the state of its internal data, may be responsible for determining whether or not each requested block was copied to the backup storage. If the block was not copied, then the OS driver suspends the block write and waits until the block has been copied and subsequently released.

In one exemplary embodiment, the requested block may be released by continuing the backup procedure (e.g., when the requested block is next block in the backup sequence). But, the request processing time can be very long and usually this type of mode is unacceptable for online systems.

Figure 10:
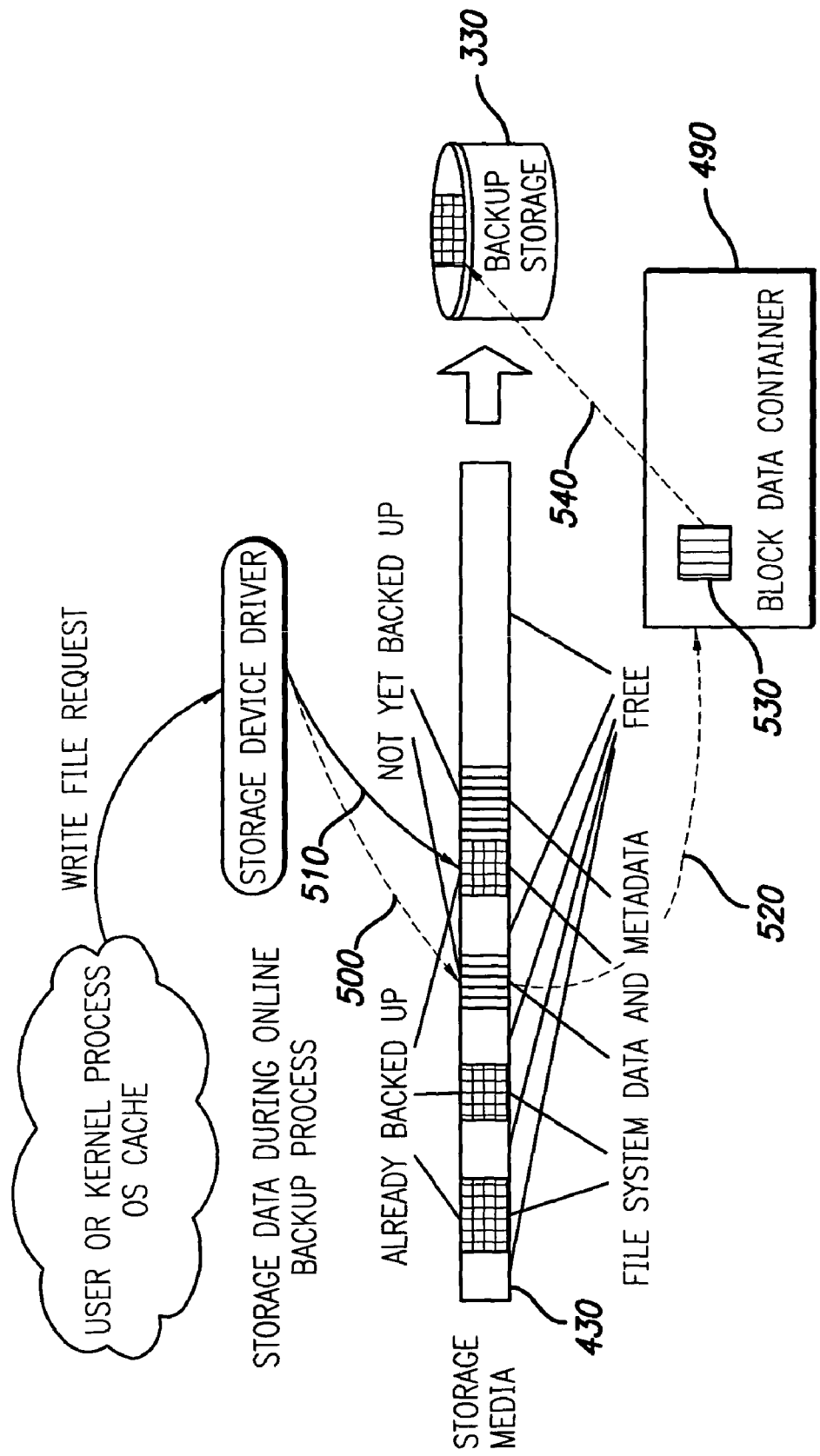
FIG. 10 shows an exemplary embodiment of the data backup process of the present invention.

In another exemplary embodiment, the block release may be performed in connection with a specific container used as an intermediate data storage. FIG. 10 shows an exemplary embodiment of the present invention in which the system utilizes a block data container to manage the block release process. When the data storage driver receives a request to write a block into the area already copied by the backup procedure 510, the required write is performed without limitations (as shown at step 955 in FIG. 9). But, if the incoming write request (shown as 500 in FIG. 10) is directed to an area not yet backed-up, then the write process is suspended and the current state of the given data area is copied to the intermediate data storage container 490, as shown at 520 in FIG. 10 (and shown as steps 960 and 965 in FIG. 9). When the copy procedure is completed, the system will allow the write procedure 500 to be executed (as shown at step 970 in FIG. 9). Thus, the content of the data block, shown as 530, at the moment the backup procedure commenced is stored in intermediate block container 490. The content 530 will be copied from container 490 by the backup procedure when required, as shown at 540 (and at step 975 in FIG. 9). The block will be flagged (as shown at step 980 in FIG. 9) and the backup process will continue. Note that the write procedure (shown at step 970) may be executed in parallel with the process of copying data from the intermediate block container to the backup storage device (shown at step 975). Accordingly, the system need not wait until the original write operation is complete to initiate the backup copy operation. Moreover, the step of writing the content of the intermediate block container 490 into the backup storage device 330 may be performed in a substantially asynchronous manner (e.g., it is not necessary to wait until the intermediate block container 490 is flushed to process the next incoming block write request if the container 490 has not overflowed). Thus, the delays that result from writing to the main storage are reduced to a minimum and the programs running on the computers connected to the data storage can continue working substantially without pause.

Figure 11:
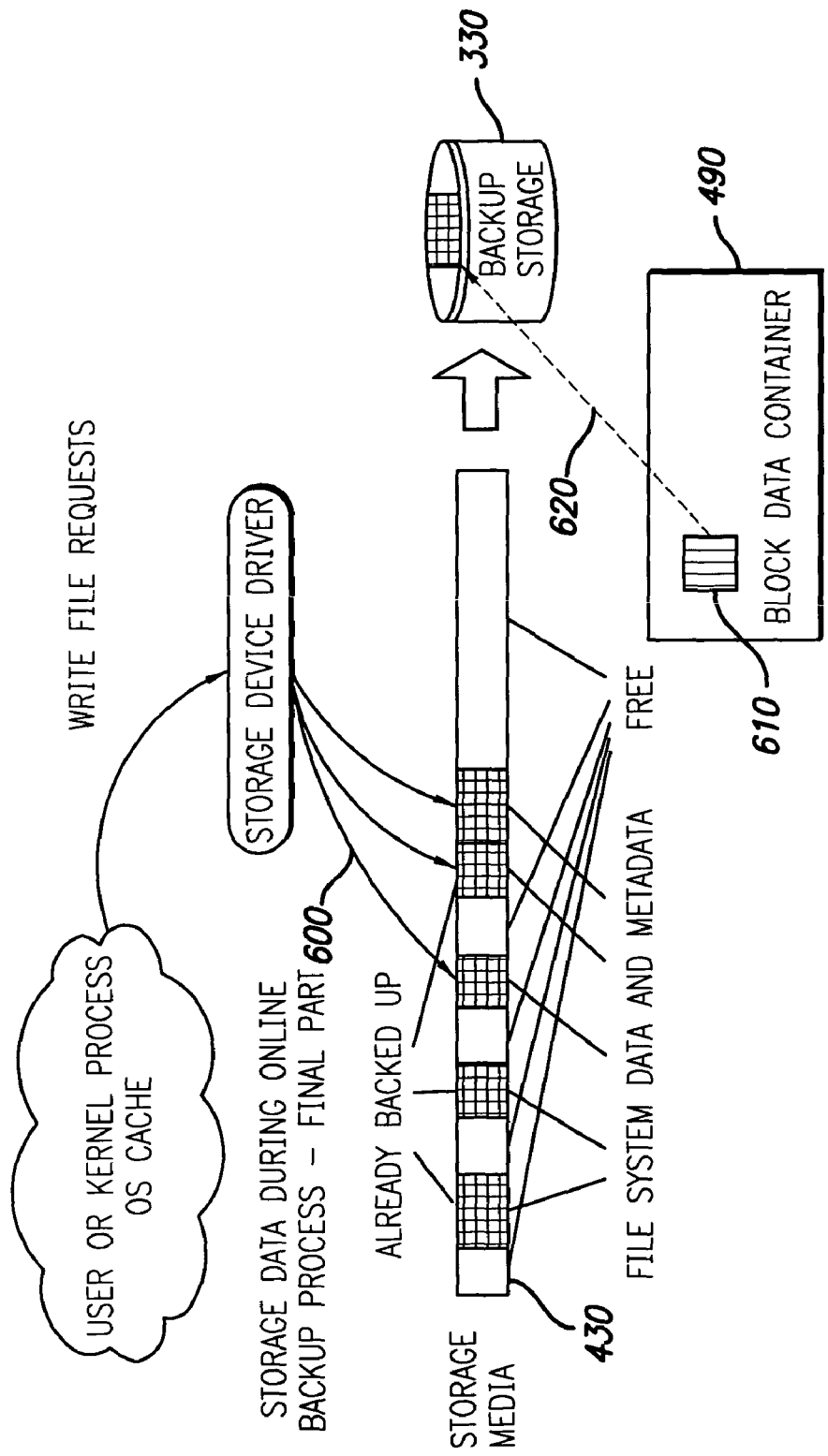
FIG. 11 shows an exemplary embodiment of the data backup process of the present invention.

Data from the intermediate storage container can be re-written to the backup storage when the write procedure of data located in the main storage has been completed or at any other appropriate time. FIG. 11 illustrates an exemplary embodiment of the process for copying data from the block data container 490 to the backup storage device 330. In this situation, although the backup process of the main storage is completed and write requests 600 directed to any regions of the data storage are performed by the driver immediately, the system must still write the data 610 that is temporarily stored in the data container 490 to the backup storage 330, shown as 620. Thus, an additional write process 620 and routine computer activity may both occur in the concurrent mode depending on the backup data storage.

Figure 12:
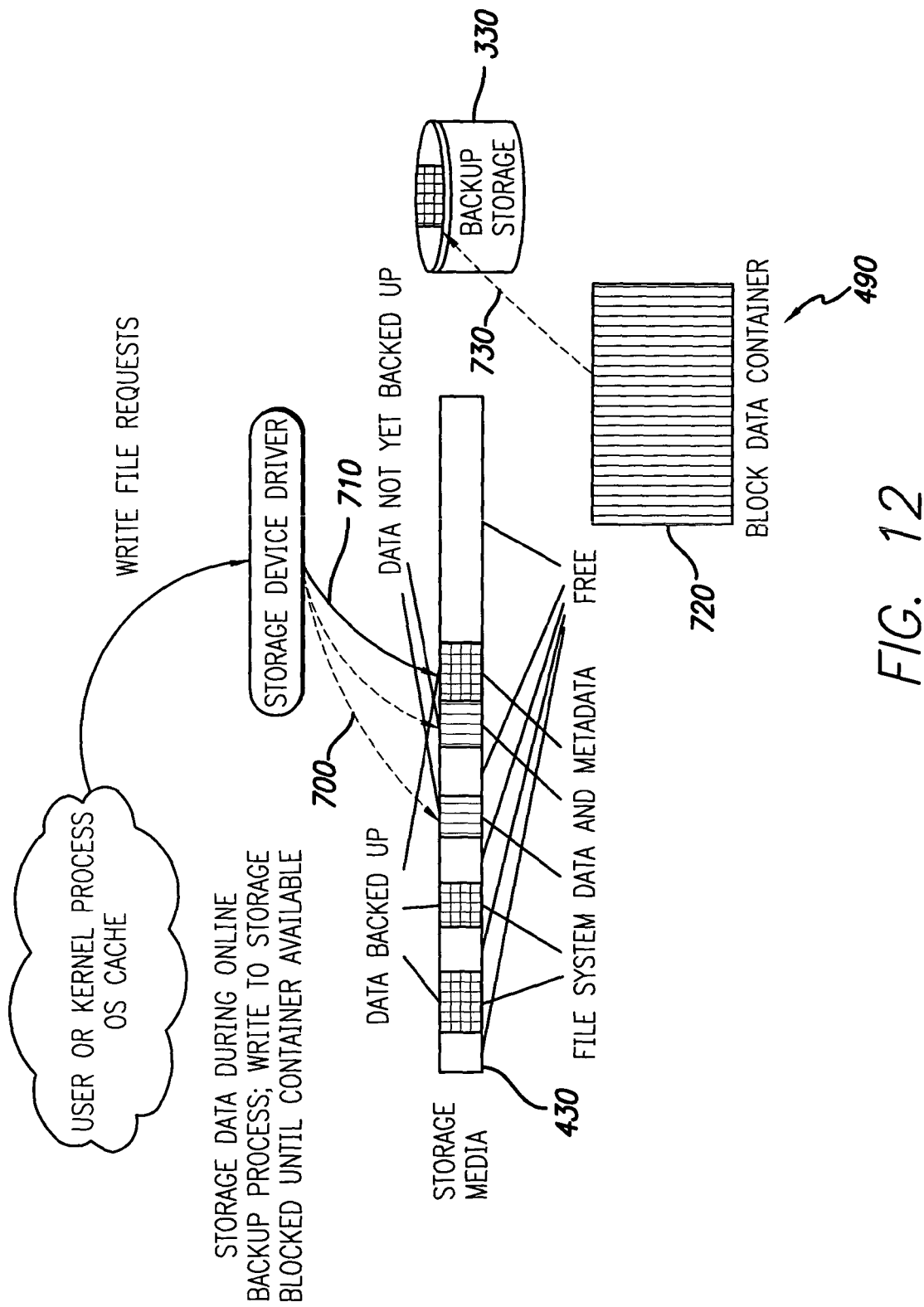
FIG. 12 shows an exemplary embodiment of the data backup process of the present invention.

FIG. 12 illustrates an exemplary embodiment of the present invention to handle an overflow of the block data container. If, during the write process to the intermediate block data container 490, the intermediate block data container 490 overflows, then the data write processes, shown as 700, to the unsaved area of the main storage device 430 should be stopped. In addition, the temporary data, shown as 720, in intermediate block data container 490 should be written, shown as 730, to the backup storage 330 in order to free space for further storage. But, if the pending write requests 710 are directed to the data in the main data storage 430 that have already been copied, then the execution of these write requests 710 should preferably not be stopped. Note that it is not necessary to flush the container 490 completely into the backup storage 330. Generally, it is sufficient to partially free the container 490 to allow a suspended process to be resumed as soon as possible.

This invention provides numerous advantages over conventional backup procedures. The present invention differs from file systems such as Episode and WAFL in that the system and method of the present invention operates at the level of data storage blocks and not at the level of inodes or files. As a result, the present invention is able to provide a faster and more efficient backup process. Moreover, the present invention utilizes a specific container as a means of intermediate data storage for the data that is subject to backup until this data is stored in the backup storage. As a result, the present invention is able to provide an efficient online backup process.

Having thus described a preferred embodiment of the computer network system of the present invention, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A computer system providing backup copying of data without suspending an application program accessing the data, comprising:
   a storage device storing block data;
   a backup storage device storing block backup data and restoring the storage device multiple times and to any prior stable consistent state of the storage device stored as the block backup data; and
   an intermediate block data container storing block backup data, wherein the computer system copies a data block from the storage device into the intermediate block data container and copies a data block from the intermediate block data container into the backup storage device during an online data backup process, and wherein the intermediate block data container is protected from data overwrite during the online backup process; and
   wherein the computer system manages the online data backup process by:
   compiling a list of data storage blocks located in the storage device that are subject to the data backup process;
   copying a data storage block to the backup storage device pursuant to the list of data storage blocks; and
   suspending a write command that is directed to a data storage block that is subject to the data backup process but has not yet been copied, copying the data storage block that is the subject of a write command to the intermediate storage device, executing the write command and copying the data storage block from the intermediate storage device to the backup storage device,
   wherein the computer system suspends a write command to the storage device during the data backup process if the intermediate block data container has reached a selected data capacity; and copies a selected amount of data from the intermediate block data container to the backup storage device.

2. The computer system of claim 1, wherein the intermediate block data container is located in the storage device.

3. The computer system of claim 2, wherein the intermediate block data container is a separate partition of the storage device.

4. The computer system of claim 1, wherein the intermediate block data container is a file within a file system of the computer system.

5. The computer system of claim 4, wherein the file system further writes dirty pages to the storage device before initiating a data backup process.

6. The computer system of claim 1, further comprising:
   a file system driver that transmits a write request to write to the storage device; and
   a storage device driver program that reads from the storage device in block mode in response to the read request and writes to the storage device in block mode in response to the write request.

7. The computer system of claim 6, wherein the file system driver translates a write request addressed to a file located in the storage device received from a user process into one or more block write operations.

8. The computer system of claim 6, wherein the file system driver transmits a write request received from an operating system process.

9. The computer system of claim 6, wherein the file system driver provides a data block number associated with a block in response to a write command directed to the data block during the online data backup process.

10. A method for providing an online data backup process for backing up data stored on a storage device associated with a computer system to a backup storage device, comprising:
   providing an intermediate data container;
   informing an operating system driver that the data is in a backup state;
   compiling a list of data blocks located in the storage device that are subject to the online data backup process;
   receiving a write operation directed to a listed data block subject to the online data backup process;
   determining if the listed data block has been copied;
   executing the write operation if the listed data block has been copied; and
   suspending the write operation if the listed data block has not been copied, copying the listed data block to the intermediate block data container, and executing the write operation, wherein the backup storage device restores the storage device multiple times and to any prior stable consistent state of the storage device stored as the block backup data, and wherein the intermediate data container is protected from data overwrite during the online backup process; and upon receiving an indication that the intermediate block data container is close to overload, the initiating a temporary slowdown of write operations by slowing down processes whose activity results in write operations into a non-backed-up area.

11. The method of claim 10, further comprising the step of copying the listed data block from the intermediate block data container to a backup storage device.

12. The method of claim 10, further comprising flagging a data block once the data block has been copied to the backup storage device.

13. The method of claim 10, further comprising the step of informing the operating system driver that all of the data blocks subject to the online data backup process have been copied to the backup storage device.

14. The method of claim 10, further comprising the step of receiving a data block number associated with the listed data block upon receiving a write operation directed to a listed data block.

15. The method of claim 10, further comprising the step of writing a dirty page to the storage device before informing an operating system driver that the data is in a backup state.

16. The method of claim 10, wherein the step of providing the intermediate block data container further comprises the step of providing a storage device external to the computer system.

17. The method of claim 10, wherein the step of providing the intermediate block data container further comprises the step of providing a selected section of the storage device.

18. The method of claim 10, wherein the step of providing the intermediate block data container further comprises the step of providing a selected file located in a file system associated with the computer system.

19. The method of claim 10, wherein the step of suspending the write operation if the listed data block has not been copied, further comprises the steps of:
determining whether the intermediate block data storage has reached a selected capacity: and
copying a selected portion of the intermediate block data storage to the backup storage device if the intermediate block data storage has reached the selected capacity.

20. The method of claim 10, wherein a list of data blocks located in the storage device that are subject to the online data backup process includes all blocks of an underlying storage device used by file system data and does not don't include free space blocks.

21. A system for data backup, comprising:
a storage device;
a backup storage device restoring the storage device multiple times and to any prior stable consistent state of the storage device stored as the block backup data; and
an intermediate storage device protected from data overwrite during an online backup process,
wherein, when a write command is directed to a data storage block identified for backup that has not yet been backed up, the identified data storage block is copied from the storage device to the intermediate storage device, the write command is executed on the data storage block in the intermediate storage device, and the data storage block is copied from the intermediate storage device to the backup storage device, and wherein the system, upon receiving an indication that the intermediate block data container is close to overload, initiates a temporary slowdown of write operations by slowing down processes whose activity results in write operations into a non-backed-up area.

22. The system of claim 21, wherein the intermediate storage device is located in the storage device.

23. The system of claim 22, wherein the intermediate storage device is a separate partition of the storage device.

24. The system of claim 21, wherein the intermediate storage device is a file within a file system.

25. The system of claim 24, wherein the file system writes dirty pages to the storage device before initiating a data backup process.

26. The system of claim 21, further comprising:
a file system driver for transmitting the write command to the storage device; and
a storage device driver program for reading from the storage device and writing to the storage device in block mode in response to the write command.

27. The system of claim 26, wherein the file system driver translates the write command received from a user process and addressed to a file located in the storage device into one or more block write operations.

28. The system of claim 26, wherein the file system driver transmits the write command received from an operating system process.

29. The system of claim 26, wherein the file system driver provides a data block number associated with a block in response to the write command directed to the data block during an online backup.

30. The system of claim 21, further comprising means for slowing down processes whose activity results in write operations into a nonbacked-up area, in response to an indication that the intermediate storage device is close to overload.

31. The system of claim 21, wherein data blocks in the storage device that are subject to the online data backup process includes all blocks of an underlying storage device used by file system data and does not include free space blocks.

32. The system of claim 21, wherein backed up data blocks are restored on the fly to a different storage device.

33. The system of claim 21, wherein an order in which data blocks are scheduled for backup is changed based on information received from an external source.

34. A method for providing an online data backup, comprising:
providing an intermediate storage;
informing an operating system driver that data in a storage device is in a backup state;
identifying data blocks in the storage device that are subject to the online data backup;
receiving a write command directed to an identified data block;
determining if the identified data block has been copied;
proceeding with a write operation if the identified data block has been copied;
suspending the write operation if the identified data block has not been copied, copying the identified data block to the intermediate storage, and executing the write operation on the data block in the intermediate storage;
copying the identified data block from the intermediate storage to a backup storage device,
wherein the storage device is restored multiple times and to any prior stable consistent state of the storage device stored as block backup data, and wherein the intermediate storage is protected from data overwrite during the online data backup; and upon receiving an indication that the intermediate block data container is close to overload, the initiating a temporary slowdown of write operations by slowing down processes whose activity results in write operations into a non-backed-up area.

35. The method of claim 34, further comprising flagging a data block once the data block has been copied to the backup storage device.

36. The method of claim 34, further comprising informing an operating system driver that all the identified data blocks have been copied to the backup storage device.

37. The method of claim 34, further comprising receiving a data block number associated with the identified data block upon receiving the write operation directed to the identified data block.

38. The method of claim 34, further comprising writing a dirty page to the storage device before informing an operating system driver that the data is in the backup state.

39. The method of claim 34, wherein the step of copying comprises copying the identified data block to intermediate storage, wherein the intermediate storage comprises an external storage device.

40. The method of claim 34, wherein providing the intermediate storage further comprises providing a selected partition of the storage device.

41. The method of claim 34, wherein the step of providing the intermediate storage further comprises the step of providing a selected file located in a file system associated with the computer system.

42. The method of claim 34, further comprising, upon receiving an indication that the intermediate data storage is close to overload, the initiating a temporary slowdown of write operations by slowing down processes whose activity results in write operations into a non-backed-up area.

43. The method of claim 34, wherein a list of data blocks located in the storage device that are subject to the online data backup includes all blocks of an underlying storage device used by file system data and does not include free space blocks.

44. The method of claim 34, further comprising informing an operating system driver that data in the storage device is in a backup state.

45. The method of claim 34, wherein backed up data blocks are restored on the fly to a different storage device.

46. The method of claim 34, wherein an order in which data blocks are scheduled for the online data backup is changed based on information received from an external source.

* * * * *